Figure 1:
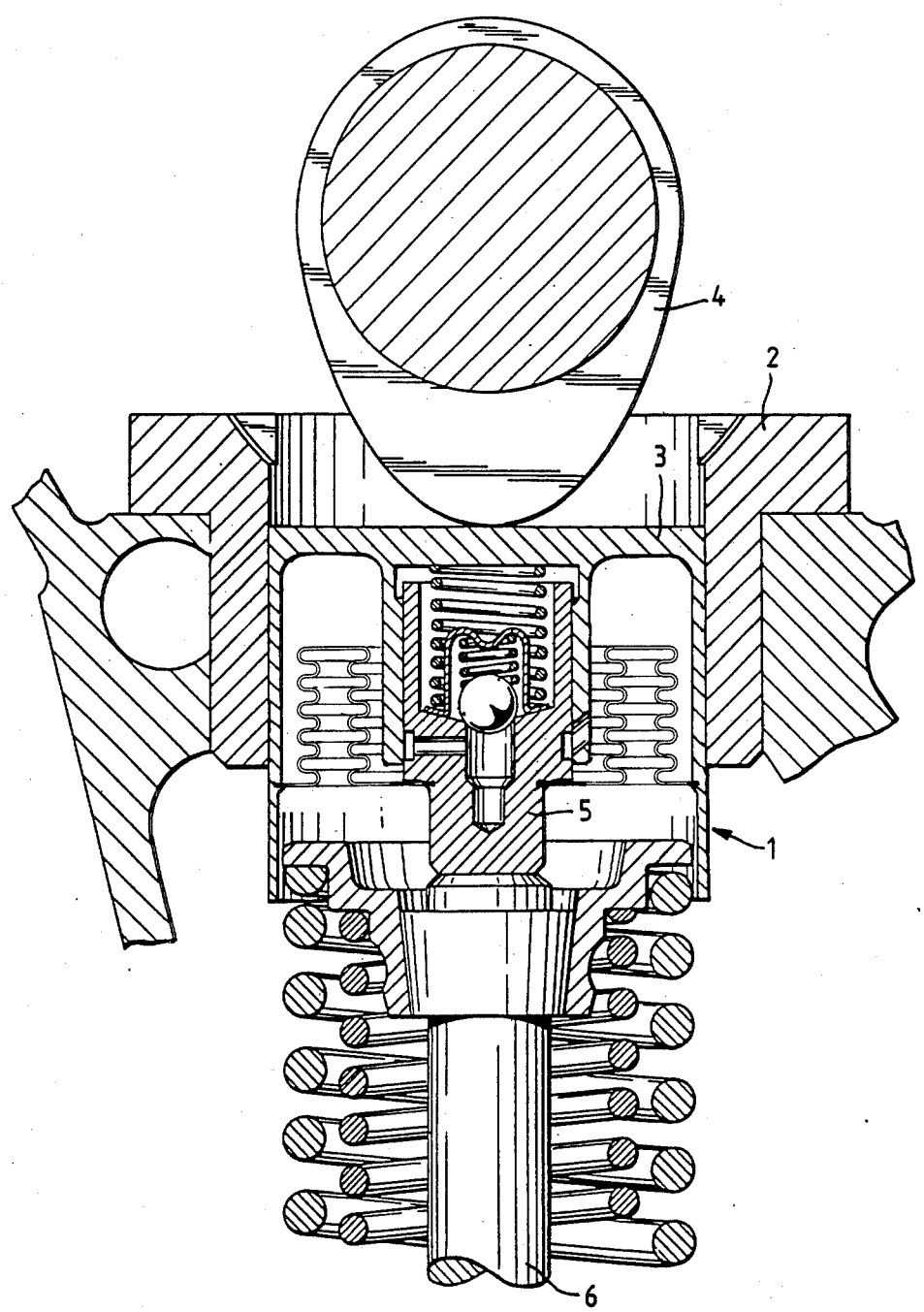

United States Patent [19]

Speil

[11] Patent Number: 4,686,947

[45] Date of Patent: Aug. 18, 1987

[54] HYDRAULIC CUP-SHAPED VALVE TAPPETS

[75] Inventor: Walter Speil, Ingolstadt, Fed. Rep. of Germany

[73] Assignee: Motomak Motorenbau, Maschinen-und Werkzeugfabrik, Konstruktionen GmbH, Fed. Rep. of Germany

[21] Appl. No.: 836,243

[22] Filed: Mar. 5, 1986

[30] Foreign Application Priority Data

Mar. 29, 1985 [DE] Fed. Rep. of Germany ....... 3511501

[51] Int. Cl.$^4$ ................................................. F01L 1/24
[52] U.S. Cl. ................................. 123/90.58; 123/90.55
[58] Field of Search ............... 123/90.55, 90.58, 90.59, 123/90.56, 90.57

[56] References Cited

U.S. PATENT DOCUMENTS

| | | | |
|---|---|---|---|
| 2,109,459 | 3/1938 | Best | 123/90.55 |
| 2,109,809 | 3/1938 | Van Ranst | 123/90.59 |
| 2,109,815 | 3/1938 | Best | 123/90.59 |
| 2,746,437 | 5/1956 | Van Slooten | 123/90.59 |
| 2,873,729 | 2/1959 | Van Slooten | 123/90.59 |
| 2,925,074 | 2/1960 | Dadd | 123/90.59 |
| 4,590,899 | 5/1986 | Kowal et al. | 123/90.58 |
| 4,610,225 | 9/1986 | Comosso et al. | 123/90.58 |
| 4,624,225 | 11/1986 | Kowal | 123/90.58 |

FOREIGN PATENT DOCUMENTS

| | | | |
|---|---|---|---|
| 43275 | 3/1980 | Japan | 123/90.58 |
| 573601 | 9/1977 | U.S.S.R. | 123/90.55 |

Primary Examiner—Ira S. Lazarus
Attorney, Agent, or Firm—Bierman & Muserlian

[57] ABSTRACT

An hydraulic cup-shaped valve tappet for internal combustion engines with an overhead camshaft comprising an outer hollow cylindrical housing (7) closed at one end by a bottom (3) in which is provided, concentrically radially spaced, a guide tube starting from the bottom, and in which is supported a longitudinally moveble plunger (5) of an hydraulic clearance compensation element, against the face thereof the end of a valve stem is abutting, a control cam (4) abutting against the bottom of the housing, characterized in that in the circular space between the cylindrical internal surface of the housing (7) and the external surface of the guide tube (8) a bellow element (16,21,25,31) is provided, said element being tightly connected, on the one hand, with the internal surface of the housing (7) and, on the other hand, with an end of the plunger (5) projecting from the guide tube which is capable to simultaneously take up variations in length and in volume and which together with the remaining tappet components define an oil-filled internal space completely closed outwardly.

8 Claims, 5 Drawing Figures

HYDRAULIC CUP-SHAPED VALVE TAPPETS

STATE OF THE ART

Hydraulic cup-shaped tappets for internal combustion engines with overhead camshafts comprising an outer hollow cylindrical housing closed at one end by a bottom in which a guide tube issuing from the bottom concentrically radially spaced in which a longitudinally moveable plunger of a hydraulic play compensating element is supported with the end of a valve stem abutting against the face thereof with a control cam abutting against the bottom of the housing are known. The circular hollow space between the cylindrical inner surface of the housing and the external surface of the guide tube is as a rule developed as an oil supply chamber which is supplied with oil from the lubrication system of the internal combustion engine through a hole in the outer wall of the housing. This entails several undesirable consequences, namely that dirt particles and especially air also get into the tappet with the constantly newly supplied oil. Moreover when the engine is shut off, the tappet can run empty through this oil feed hole which may result in that when the engine is restarted, it will initially suck in air and will therefore not be able to perform its function.

To eliminate these disadvantages, hydraulic cup-shaped tappets have already been suggested, especially for engines with camshafts at the bottom, which represent a self-contained system with a single oil feed to avoid the aforementioned disadvantages. To this end, it is necessary to provide an oiltight limit for the oil supply chamber that can accommodate the tappet's changes in length occurring during operation. However, during these changes in length, volume changes take place simultaneously in the outer chamber, requiring that a second flexible element be provided to counterbalance these volume changes. For this purpose, two separate bellows are provided in one known tappet described in Swiss Pat. No. 259,209, arranged in series in the axial direction, whereby one serves exclusively to accommondate the occurring changes in length, while the other serves exclusively to balance the changes in volume. This design requires a very great axial length of the tappet which can be realized only in engines with camshafts at the bottom.

OBJECTS OF THE INVENTION

It is an object of the invention to create an hydraulic tappet for internal combustion engines with an overhead camshaft by which, despite an extremely limited total axial length, a self-contained sytem is realized, which meets all the set requirements.

This and other objects and advantages of the invention will become obvious from the following detailed description.

THE INVENTION

The tappets of the invention are an hydraulic cup-shaped valve tappet for internal combustion engines with an overhead camshaft comprising an outer hollow cylindrical housing (7) closed at one end by a bottom (3) in which is provided, concentrically radially spaced, a guide tube starting from the bottom, and in which is supported a longitudinally moveable plunger (5) of an hydraulic clearance compensation element, against the face thereof the end of a valve stem is abutting, a control cam (4) abutting against the bottom of the housing, characterized in that in the circular space between the cylindrical internal surface of the housing (7) and the external surface of the guide tube (8) a bellow element (16,21,25,31) is provided, said element being tightly connected, on the one hand, with the internal surface of the housing (7) and, on the other hand, with an end of the plunger (5) projecting from the guide tube (8) which is capable to simultaneously taken up variations in length and in volume and which together with the remaining tappet components define an oil-filled internal space completely closed outwardly.

This prior art problem is solved by a bellows element accommodated in the circular cavity between the cylindrical inner surface of the housing and the outside surface of the guide tube which is tightly joined to the inner surface of the housing, on the one hand, and with an end of the plunger projecting from the guide tube, on the other hand, which is able to simultaneously accept changes in length and volume, and which together with the other tappet components defines an oil-filled internal space of the tappet that is completely closed outwardly. Given the limited available total axial space in such tappets, the solution to the problem is possible only in that not two separate bellows but a single bellows element is used which is able to accept changes in both length and volume.

Such a bellows element can be formed, for example, by two hollow cylindrical bellows concentriclly arranged inside each other with space between them, which at one of their ends are joined together tighly by a radial flange, while their other ends are tightly connected with the inner surface of the housing, on the one hand, and with an end of the plunger projecting from the guide tube, on the other hand. However, the bellows element can also be formed of a hollow cylindrical bellows, one end of which is joined with a circularly radially outwardly directed bellows with fold-beads running concentrically to each other.

These bellows elements may be made of different materials and may be designed differently. Thus, it is possible to construct these bellows elements in one piece of a polymeric material, e.g., of a plastic material or rubber. However, the bellows element can also be made of metal, in which case it may be appropriate for manufactuing reasons to form the element from separate metal bellows connected to each other by soldering, welding, especially high energy beam welding, or by other suitable joining processes. When the bellows element is made of a polymeric material, metal rings may be attached to its free ends, particularly to prevulcanize them to them, to serve as connection to the adjoining tappet components. It may be appropriate to coat the metal rings with a polymeric material at their seatings next to the adjoining tappet components to ensure thereby a secure, fluid-tight connection.

Figure 2:
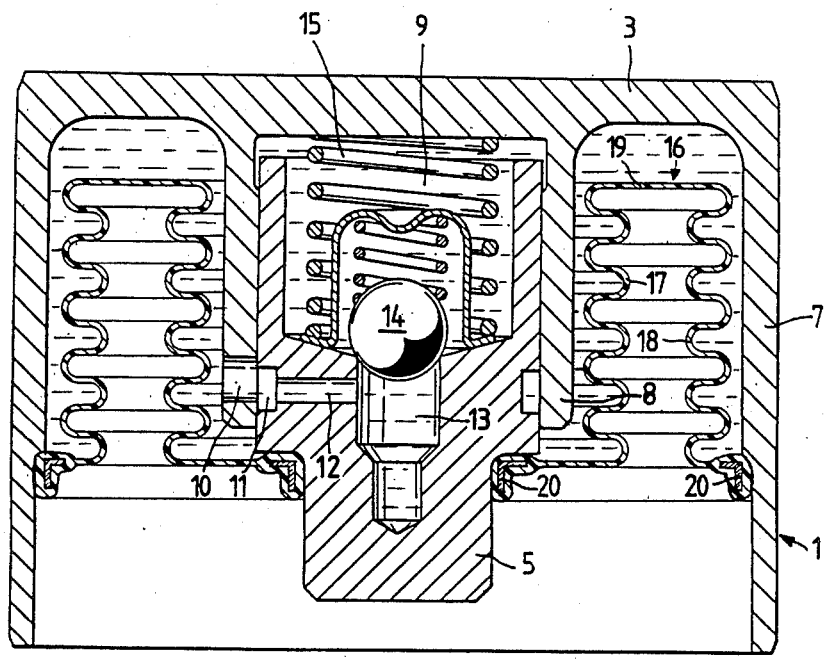
Figure 3:
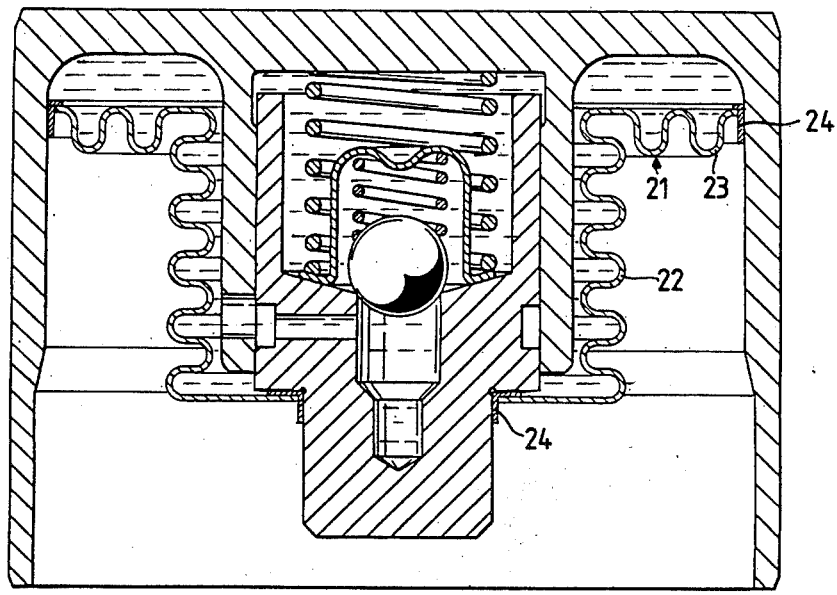
Figure 4:
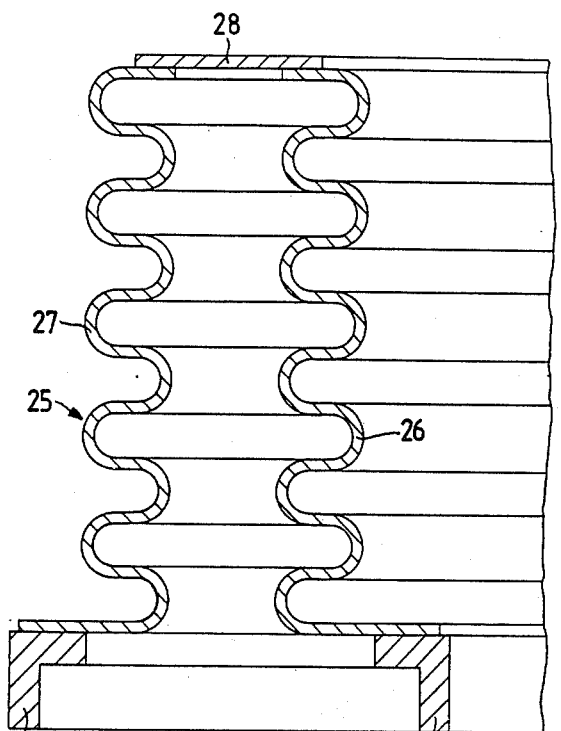
Figure 5:
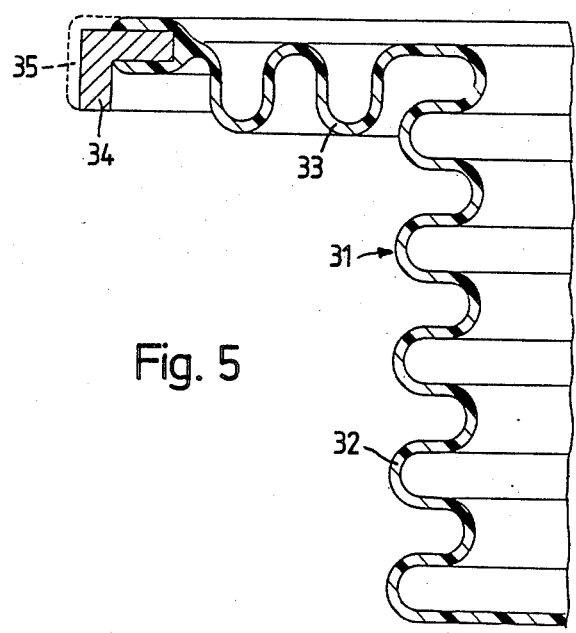

Referring now to the drawings:

FIG. 1 is a longitudinal cross-section through one embodiment of a tappet of the invention, FIG. 2 is a longitudinal section through another embodiment of a tappet of the invention, FIG. 3 is a longitudinal section of a tappet design modified from FIG. 2, FIGS. 4 and 5 are longitudinal cross-sections through individual bellows elements.

A tappet of the invention situated in a valve drive is illustrated in FIG. 1 and tappet 1 is arranged longitudinally displaceable in a guide 2 of the engine block. Peripheral cam 4 bears against its closed bottom 3 and piston 3 bears upon the stem 6 of a gas-reversing valve.

In FIG. 2, a tappet 1 is shown which essentially corresponds to that illustrated in FIG. 1 and it consists of outer hollow cylindrical housing 7 which at its top end is closed by bottom 3. From bottom 3, guide tube 8 starts out concentrically to housing 7 in which plunger 5 moves slidingly and which latter defines in its interior pressure chamber 9 which is supplied with oil through hole 10 in guide tube 8 from which the oil gets into annular groove 11 of plunger 5 and from there by way of crosshole 12 to longitudinal hole 13 which is closed off by a ball check valve 14. Inside the pressure chamber 9, a helical spring 15 is provided which pushes plunger 5 downwards out of guide tube 8.

In the circular cavity between the cylindrical inner surface of housing 7 and the outer surface of guide tube 8, a bellows element 16 is accommodated which is tightly joined to the inner surface of housing 7, on the one hand, and with the end of plunger 5 projecting from guide tube 8, on the other hand. Bellows element 16 is comprised of two hollow cylindrical bellows 17 and 18 which are concentrially arranged inside each other with space between them and which are joined to each other at one of their ends by a radial flange 19. In the simplest case shown in FIG. 2, the two bellows 17 and 18 are manufactured in a single piece together with radial flange 19. The bellows element 16 shown in FIG. 2 is comprised of a polymeric material and metal angle rings 20 are provided to attach its ends to the adjoining tappet components. The rings 20 are completely embedded in the polymeric material so that they can tightly seal off the ends of bellows element 16 under prestress against the defining tappet components.

FIG. 3 is a variation with a metallic bellows element 21 formed of a hollow cylindrical bellows 22, at the top end of which it adjoins a circular, radially outwardly directed bellows 23 with fold beads running concentrically to each other. In this embodiment, metal angle rings 24 are provided at the ends of the bellows element, which rings can be attached to the bellows element, on one hand, and to the adjoining tappet components, on the other hand, e.g., by means of soldering, welding or similar means.

FIG. 4 illustrates a bellows element whose design in principle corresponds to that of FIG. 2 which is comprised of two concentric metal bellows 26 and 27 joined to each other at their top ends by annular flange 28 and at their opposite ends, bellows 26 and 27 carry angle rings 29 and 30. The connections between bellows 26 and 27, on the one hand, and annular flange 28 and angle rings 29 and 30, respectively, on the other hand, can be effected by any suitable means such as soldering, welding, especially high energy beam welding, adhesion, or any other suitable type of joining.

FIG. 5 illustrates a bellows element 31 made of polymeric material which essentially corresponds to that of FIG. 3 and comprises a hollow cylindrical bellows 32, which at its top end adjoins radial bellows 33. The latter is connected at its radial outer end to metal angle ring 34 and the connection between angle ring 34 and the polymeric material embracing it can be effected by vulcanization, but also by gluing or similar means. In a modification of the embodiment shown, the polymeric material can also coat the radial outside seat of angle ring 34 as indicated by broken line 35. The invention is not limited to tappet embodiments as shown in FIGS. 1 to 3 wherein the hydraulic play compensating element consists of a single plunger 5 accommodated in guide tube 8. Rather the invention can also be applied to tappets in which a play compensating element is used consisting of two plungers guided concentrically within each other, for example, according to German Patent Application No. 3,023,686. In this case, the bellows element would have to be pressure-tightly connected to the end of the outer plunger projecting from the guide tube.

Various other modifications of the invention may be made without departing from the spirit or scope thereof and it is to be understood that the invention is intended to be limited only as defined in the appended claims.

What I claim is:

1. An hydraulic cup-shaped valve tappet for internal combustion engines with an overhead camshaft comprising an outer hollow cylindrical housing (7) closed at one end by a bottom (3) in which is provided, concentrically radially spaced, a guide tube starting from the bottom, and in which is supported a longitudinally moveable plunger (5) of an hydraulic clearance compensation element, against the face thereof the end of a valve stem is abutting, a control cam (4) abutting against the bottom of the housing, characterized in that in the circular space between the cylindrical internal surface of the housing (7) and the external surface of the guide tube (8) a bellow element (16,21,25,31) is provided, said element being tightly connected, on the one hand, with the internal surface of the housing (7) and, on the other hand, with an end of the plunger (5) projecting from the guide tube (8) which is capable to simultaneously take up variations in length and in volume and which together with the remaining tappet components define an oil-filled internal space completely closed outwardly.

2. A tappet of claim 1 wherein the bellows element (16,25) is formed of two hollow cylindrical bellows (17,18,26,27) concentrically arranged inside each other with space between them, which at one of their ends are joined together liquid-tight with a radial flange (19,28).

3. A tappet of claim 1 wherein the bellows element (21,31) is formed of a hollow cylindrical bellows (22,32), one end of which is joined to a circularly radially outwardly directed bellows (23,33) with fold-beads running concentrically to each other.

4. A tappet of claim 1 wherein the bellows element (16,31) is formed in one piece made of a polymeric material.

5. A tappet of claim 1 wherein the bellows element (25) is formed of separate metal bellows (26,27) which are connected to each other by soldering or welding.

6. A tappet of claim 5 wherein the connection is effected by high energy beam welding.

7. A tappet of claim 4 wherein metal rings (20,24,29,34) are attached at the free ends of the bellows element (16,21,25,31), particularly prevulcanized, to serve as connection to the adjoining tappet components.

8. A tappet of claim 7 wherein the metal rings (20,34) are coated with a polymeric material at their seatings next to the adjoining tappet components (35).

* * * * *